United States Patent [19]

Cherek et al.

[11] Patent Number: 5,578,994
[45] Date of Patent: Nov. 26, 1996

[54] LIQUID LEVEL SWITCH

[75] Inventors: Bogdan Cherek; John E. Gillis, both of Peterborough, Canada

[73] Assignee: Milltronics Ltd., Peterborough, Canada

[21] Appl. No.: 248,911

[22] Filed: May 25, 1994

[51] Int. Cl.$^6$ .................................................. G08B 21/00
[52] U.S. Cl. .................... 340/618; 340/620; 73/290 V; 73/DIG. 4; 137/386
[58] Field of Search .................................. 340/618, 621, 340/612; 73/290 R, 290 V, DIG. 4; 137/386, 392, 400

[56] References Cited

U.S. PATENT DOCUMENTS

| | | | |
|---|---|---|---|
| 3,079,596 | 2/1963 | Atkinson . | |
| 3,706,981 | 12/1972 | Hart | 340/621 |
| 3,745,829 | 7/1973 | Franchi | 73/290 V |
| 3,944,994 | 3/1976 | Fanshawe | 340/621 |
| 4,316,183 | 2/1982 | Palmer et al. | 340/621 |
| 4,540,981 | 9/1985 | Lapetina et al. | 340/618 |
| 4,594,584 | 6/1986 | Pfeiffer et al. | 340/618 |
| 4,703,652 | 1/1987 | Itoh et al. | 340/621 |
| 4,740,726 | 4/1988 | Umezawa | 73/290 V |
| 4,785,663 | 11/1988 | Hermann | 73/290 V |
| 4,928,525 | 5/1990 | Alderholt et al. | 73/155 |
| 5,031,451 | 7/1991 | Webster | 340/621 |
| 5,191,316 | 3/1993 | Dreyer | 73/290 V |
| 5,191,795 | 3/1993 | Fellingham et al. | 340/621 |
| 5,264,831 | 11/1993 | Pfeiffer | 340/618 |

Primary Examiner—Jeffery Hofsass
Assistant Examiner—Daniel J. Wu
Attorney, Agent, or Firm—Ridout & Maybee

[57] ABSTRACT

A piezoelectric liquid level switch is provided which can be made immune to standing wave effects and provides an unequivocal response to liquid contact. The switch incorporates an electrical oscillator circuit including frequency defining elements in both feed forward and feedback circuit paths, the frequency defining element in the feedback path being a piezoelectric crystal device constructed to have a lowest frequency vibration mode in air which is substantially equal to a first frequency defined by the frequency defining element in the feed forward circuit, which mode is suppressed by acoustic coupling of the device to a body of liquid such that a lowest frequency vibration mode of the device when in contact with liquid has a second frequency which is substantially above the frequency of the frequency defining element in the feed forward circuit, whereby positive feedback through the oscillator circuit can occur when the piezoelectric device is in contact with air, but not when it is in contact with liquid, and a threshold circuit for detecting an output from the oscillator circuit at said first frequency. The piezoelectric element is preferably coupled to a column coaxial with it, the column having a liquid contacting member at its free end, such that a vibration antinode at or near the liquid contacting member is suppressed and the lowest resonant frequency of the device is substantially increased when the member is in contact with liquid.

4 Claims, 1 Drawing Sheet

LIQUID LEVEL SWITCH

BACKGROUND OF THE INVENTION

Field of the Invention

This invention relates to devices for sensing the attainment of a particular level by a liquid, particularly a high level which requires the switching of an alarm signal or other indication.

REVIEW OF THE ART

Various devices have been proposed for indicating when liquid or other fluent material in a container or channel reaches a particular level. One class of device which has been extensively utilized incorporates a vibrating member, whose vibration is damped as it becomes submerged in a liquid or fluent material.

Commonly used devices have employed vibrating rods or tuning forks driven by various means to maintain vibration. One particular class of such devices with which the present invention is concerned utilizes a piezoelectric crystal device incorporated into an oscillator circuit, the action of which is damped when liquid contacts the piezoelectric crystal device. Such a device is disclosed in U.S. Pat. No. 3,706,981, issued to Hart on Dec. 19, 1972.

A potential problem with devices of the type described in the Hart patent is that under certain circumstances coupling between the piezoelectric crystal device and the liquid can occur in such a way that standing waves are set up in the liquid, thus maintaining a high oscillation amplitude even in the presence of liquid. While this will only occur under certain limited circumstances, the possibility reduces the reliability of the device. Furthermore, the degree of damping applied to the oscillator circuit will vary according to the liquid encountered and other circumstances, thus introducing a certain criticality into the setting of switching thresholds for the device.

Efforts have been made to provide piezoelectric liquid level sensor devices constructed specifically with a view to providing more predictable characteristics during operations, examples being U.S. Pat. No. 4,316,183 to Palmer et al. and 4,703,652 (Itoh et al.). The Itoh device seeks to eliminate certain factors which can influence the performance of such devices, but does not overcome the basic problems outlined above. The Palmer et al. device endeavours to propagate the vibration around a closed loop forming a wall of the device, which would presumably overcome the standing wave problem, but at the expense of considerable additional complexity in construction. Moreover, the device would still be subject to variable degrees of influence depending upon the liquid contacted and the manner in which it contacts the device.

SUMMARY OF THE INVENTION

It is an object of the present invention to provide a piezoelectric liquid level operated switch which is of simple construction yet can be made immune to standing wave effects and provides an unequivocal response to liquid contact.

According to the invention, a piezoelectric liquid level switch comprises an electrical oscillator circuit including frequency defining elements in both feed forward and feedback circuit paths, the frequency defining element in the feedback path being a piezoelectric crystal device constructed to have a lowest frequency vibration mode in air which is substantially equal to a first frequency defined by the frequency defining element in the feed forward circuit, which mode is suppressed by acoustic coupling of the device to a body of liquid such that a lowest frequency vibration mode of the device when in contact with liquid has a frequency which is substantially above the frequency of the frequency defining element in the feed forward circuit, whereby positive feedback through the oscillator circuit can occur when the piezoelectric device is in contact with air, but not when it is in contact with liquid, and means for detecting an output from the oscillator circuit at said first frequency. The oscillator circuit is powered from a DC source B+, whose potential is not critical except to the extent that it determines the amplitude of the output to the threshold detector T.

Conveniently, the piezoelectric device includes a piezoelectric element coupled to a column coaxial therewith for transmission of axial vibrations between the element and the column, the column extending vertically downwards from the piezoelectric device to a free end, and the free end being provided with a liquid engaging member capable of establishing strong mechanical coupling between the member and a liquid in contact therewith, the device having a lowest axial resonant frequency in free air substantially equal to the resonant frequency of the second frequency determining element, and a lowest resonant frequency when said surface is coupled to liquid which is substantially higher.

Thus, as compared with the prior art, the present invention relies upon contact with liquid preventing said lowest frequency mode of vibration of the piezoelectric device, which will suppress feedback in the oscillator circuit and thus prevent it from operating, rather than relying merely on the damping effect of the liquid upon the device. This mode of operation provides a reliable on-off indication, and circumvents problems due to standing wave effects.

SHORT DESCRIPTION OF THE DRAWINGS

In the drawings

FIG. 1 is a diagrammatic sectional view of a piezoelectric device utilized in implementing the invention; and FIG. 2 is a schematic diagram of a liquid level detector in accordance with the invention.

DESCRIPTION OF THE PREFERRED EMBODIMENT

Figure 1:
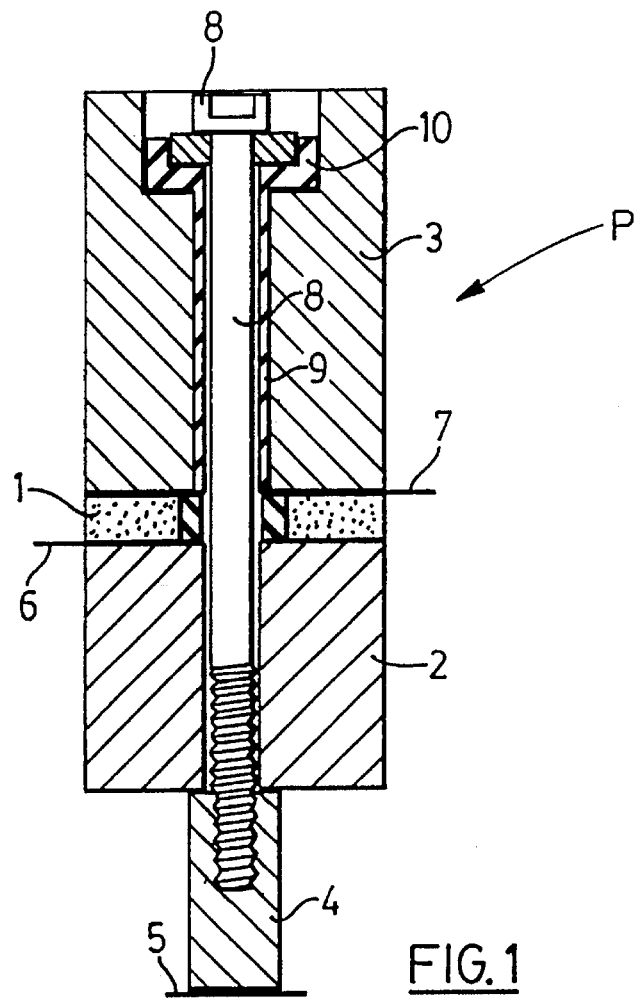
Figure 2:
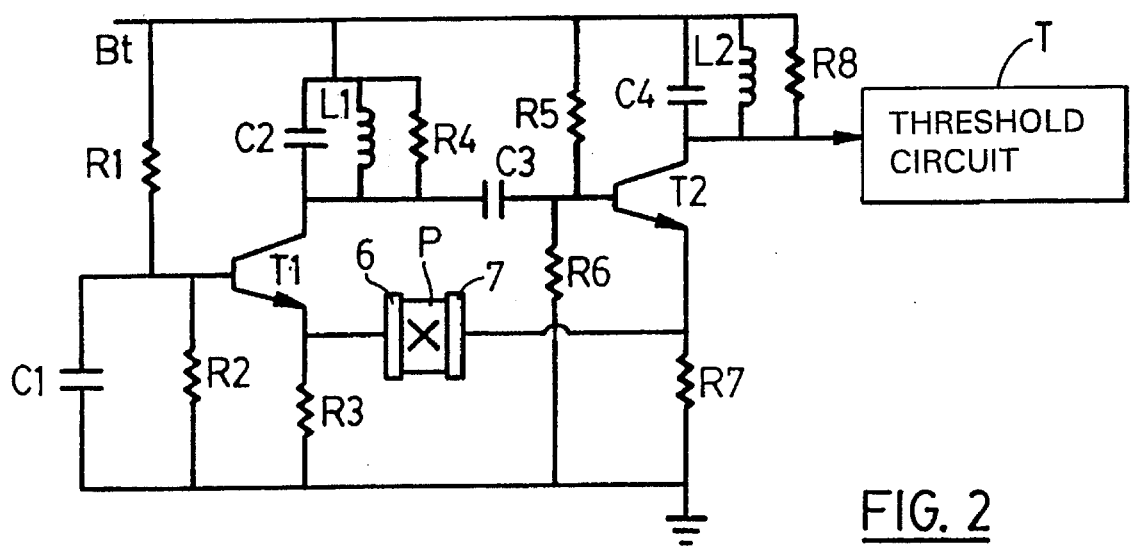

Referring first to FIG. 2, the circuit shown represents an oscillator of the well-known Butler design, in which a piezoelectric device P, in this case a device as shown in FIG. 1 is connected between the emitters of two transistors T1 and T2 forming the active devices in the circuit. Transistors T1 and T2 have respective emitter load resistors R3 and R7, while capacitor C1 provides a signal ground at the junction point of bias resistors R1 and R2 at the base of transistor T1, so that the latter operates in grounded base mode. A tuned circuit formed by inductor L1 and capacitor C2 is located in the collector circuit of transistor T1, the Q of this tuned circuit being adjusted by means of parallel resistor R4. The collector of T1 is AC coupled to the base of T2 by means of a capacitor C3, the base of transistor T2 being biased by resistors R5 and R6. An output tuned circuit having the same resonant frequency F as that formed by capacitor C2 and inductor L1 is formed by capacitor C4 and inductor L2 in the collector circuit of transistor T2, the Q of this tuned circuit being adjusted by a resistor RS. In operation of the circuit, any signal at the frequency of the tuned circuit formed by capacitor C2 and inductor L1 is fed forward to the amplifier formed by transistor T2 and its associated components. The current amplified signal appearing at the emitter of T2 is fed back through the piezoelectric device P to the emitter of the grounded base amplifier formed by transistor T1, thus providing positive feedback as long as the piezoelectric device P is resonating at the same frequency as the tuned circuit formed by inductor L1. Under these circumstances, the circuit will oscillate and an output potential at the frequency F will appear across the tuned circuit formed by inductor L2 and capacitor C4, whence it may be applied to a suitable threshold detection circuit T. The circuit T may be any form of detector capable of distinguishing between a high level signal at frequency F (indicating that the oscillator is running) and a very low or absent signal of frequency F, indicating that the oscillator is not running. This circuit may if desired include delay or integrating elements if it is desired to avoid response to transient liquid contact with the member 5.

The piezoelectric device P will present a high impedance unless it is at or close to series resonance at the resonant frequency F of the circuit defined by inductor L1 and capacitor C2. This implies that for oscillation to occur, the series resonant frequency of the piezoelectric device P must be very close to that of the circuit L1, C2. Since piezoelectric devices are typically somewhat temperature sensitive, and their frequency is also subject to some degree of drift with age, the resistors R4 and R8 are selected to provide the circuit with sufficient bandwidth to accommodate drift due to temperature and ageing. Any substantial shift in the series resonant frequency of the piezoelectric device such as that due to suppression of a vibration mode, will however prevent the circuit from oscillating, and result in the absence of any significant output to the threshold detector.

A piezoelectric device will typically have a number of possible modes of vibration. The device P of FIG. 1 is designed so that its lowest frequency mode of operation can only occur when the device is suspended in a gaseous environment. The device P consists of a piezoelectric element 1, typically a disk of piezoelectric material such as barium titanate, sandwiched between contact disks 6 and 7 and clamped between loading blocks 2 and 3 by means of a screw 8 and the block 2 threaded into a column 4 and pressing the blocks 2 and 3 against the piezoelectric element 1 through the contact washers 6 and 7. At least one of the loading blocks (3) is insulated from the column 4 and the nut by means of an insulating sleeve 9 and cup 10 so as to avoid short-circuiting the opposite faces of the element 1. The column 4 extends vertically downward below the block 3 to a liquid contact member 5, which is of sufficiently restricted dimensions that it provides little coupling between the device and ambient air, but of sufficient area and such a configuration, for example a flexible disk or doughnut shape, that substantial coupling will occur between the members and a liquid such as water as it contacts the member. Typically the elements of the device may be chosen and dimensioned so that the device will have a lowest frequency mode series resonance in air at about 20 to 50 kHz, and the inductors and capacitors in the other tuned circuits in the oscillator will be selected to provide the same resonant frequency.

It will be understood that alternative oscillator circuits could be utilized, provided that a feedback path within the oscillator is completed through the piezoelectric device, and that the oscillator also contains within the oscillator circuit at least one further frequency determining element independent of the piezoelectric device such that a substantial divergence between the resonant frequencies of the piezoelectric device and the further frequency determining circuit will cause oscillation to cease.

So far as the piezoelectric device is concerned, its structure need not be as shown, but must be such that contact with liquid whose level is being monitored will suppress the mode in which it oscillates in free air. With the arrangement shown, contact with fluid will result in a vibration antinode at or near the disk 5 being replaced by a node at or near that location, since this would force a change to a higher mode of vibration under which the conditions for oscillation can no longer be satisfied, vibration ceases. The disk 5 may be replaced by other forms of element providing effective coupling to the liquid being monitored. Different piezoelectric device structures could be utilized, provided that contact of liquid with a lowest point thereof will force a change out of the lowest frequency mode of vibration, and thus suppress oscillation in the circuit.

We claim:

1. A piezoelectric level sensor comprising an electrical oscillator circuit including frequency defining elements in both feed forward and feedback circuit paths, the frequency defining element in the feedback path being a piezoelectric crystal device constructed to have a lowest frequency vibration mode in air which is substantially equal to a first frequency defined by the frequency defining element in the feed forward circuit, which mode is suppressed by acoustic coupling of the device to a body of liquid such that a lowest frequency vibration mode of the device when in contact with liquid has a second frequency which is substantially above the frequency of the frequency defining element in the feed forward circuit, whereby positive feedback through the oscillator circuit can occur when the piezoelectric device is in contact with air, but not when it is in contact with liquid, and means for detecting an output from the oscillator circuit at said first frequency.

2. A level sensor according to claim 2 wherein the piezoelectric device includes a piezoelectric element coupled to a column coaxial therewith for transmission of axial vibrations between the element and the column, the column extending vertically downwards from the piezoelectric device to a free end, and the free end being provided with a liquid engaging member capable of establishing strong mechanical coupling between the member and a liquid in contact therewith, the device having a lowest axial resonant frequency in free air substantially equal to the resonant frequency of the second frequency determining element, and a lowest resonant frequency when said surface is coupled to liquid which is substantially higher.

3. A level sensor according to claim 1 wherein the electrical oscillator circuit is a Butler oscillator.

4. A level sensor according to claim 1, wherein the piezoelectric crystal device includes a liquid engaging member, and exhibits in operation a vibration antinode substantially at said liquid engaging member when the liquid engaging member is not engaged with liquid, and exhibits in operation a vibration node substantially at said liquid engaging member when the liquid engaging member is engaged with liquid.

* * * * *